(12) United States Patent
Ge et al.

(10) Patent No.: US 8,432,705 B2
(45) Date of Patent: Apr. 30, 2013

(54) EXPANSION APPARATUS WITH SERIAL ADVANCED TECHNOLOGY ATTACHMENT DUAL IN-LINE MEMORY MODULE

(75) Inventors: Ting Ge, Shenzhen (CN); Wen-Sen Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 68 days.

(21) Appl. No.: 13/270,812

(22) Filed: Oct. 11, 2011

(65) Prior Publication Data
US 2013/0070412 A1    Mar. 21, 2013

(30) Foreign Application Priority Data
Sep. 21, 2011  (CN) .......................... 2011 1 0281666

(51) Int. Cl.
*H05K 1/14* (2006.01)
*H05K 1/11* (2006.01)

(52) U.S. Cl.
USPC ........... 361/785; 361/728; 361/729; 361/736; 361/760; 361/784

(58) Field of Classification Search .............. 361/785, 361/728, 729, 736, 760, 789, 792
See application file for complete search history.

(56) References Cited

U.S. PATENT DOCUMENTS 6,692,293 B2 *  2/2004  MacLaren et al. ............ 439/489
7,148,428 B2 * 12/2006  Meier et al. .................. 174/260

* cited by examiner

*Primary Examiner* — Timothy Thompson
*Assistant Examiner* — Andargie M Aychillhum
(74) *Attorney, Agent, or Firm* — Altis Law Group, Inc.

(57) ABSTRACT

An expansion apparatus includes a serial advanced technology attachment dual-in-line memory module (SATA DIMM) with a first circuit board, an expansion card with a second circuit board, and a cable member. A first edge connector is set on a bottom edge of the first circuit board and includes a number of first power pins connected to a control chip, a number of first storage chips, and a first connector, and a number of first ground pins. A second edge connector is set on a bottom edge of the second circuit board and includes a number of second power pins connected to a number of second storage chips and a second connector, and a number of second ground pins. The cable member includes a cable, a third connector connected to the first connector, and a fourth connector connected to the second connector.

7 Claims, 2 Drawing Sheets

EXPANSION APPARATUS WITH SERIAL ADVANCED TECHNOLOGY ATTACHMENT DUAL IN-LINE MEMORY MODULE

BACKGROUND

1. Technical Field

The present disclosure relates to an expansion apparatus with a serial advanced technology attachment dual in-line memory module (SATA DIMM).

2. Description of Related Art

Storage capacity requirements of a server are very high, and SATA DIMMs can be used for adding memory to the storage capacity. The number of storage chips arranged on the SATA DIMM is limited, which leads to the need for several SATA DIMMs to add significant storage capacity to the server. However, these SATA DIMMs are expensive. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by limitation. References to "an" or "one" embodiment in this disclosure are not necessarily to the same embodiment, and such references mean at least one.

Figure 1:
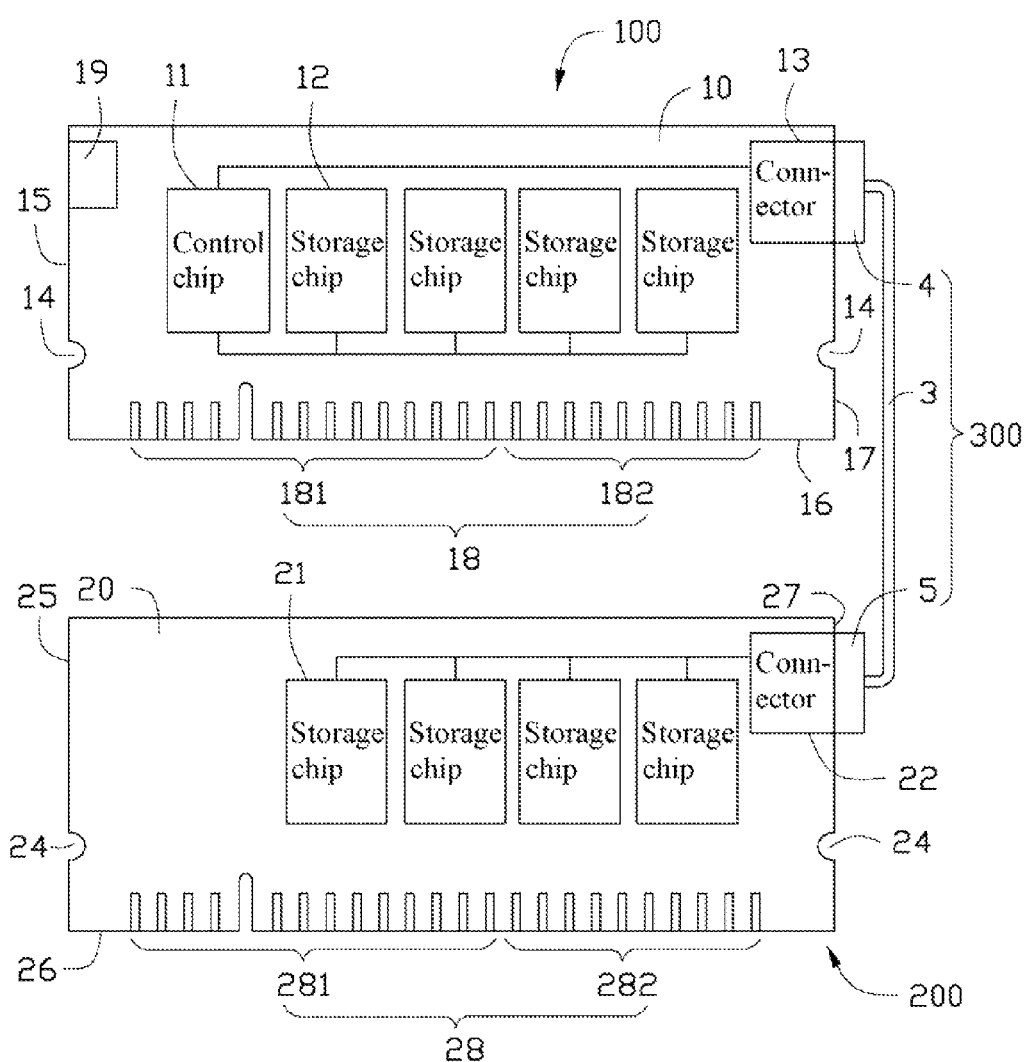
FIG. 1 is a schematic, plan view of an expansion apparatus in accordance with an exemplary embodiment of the present disclosure.
Figure 2:
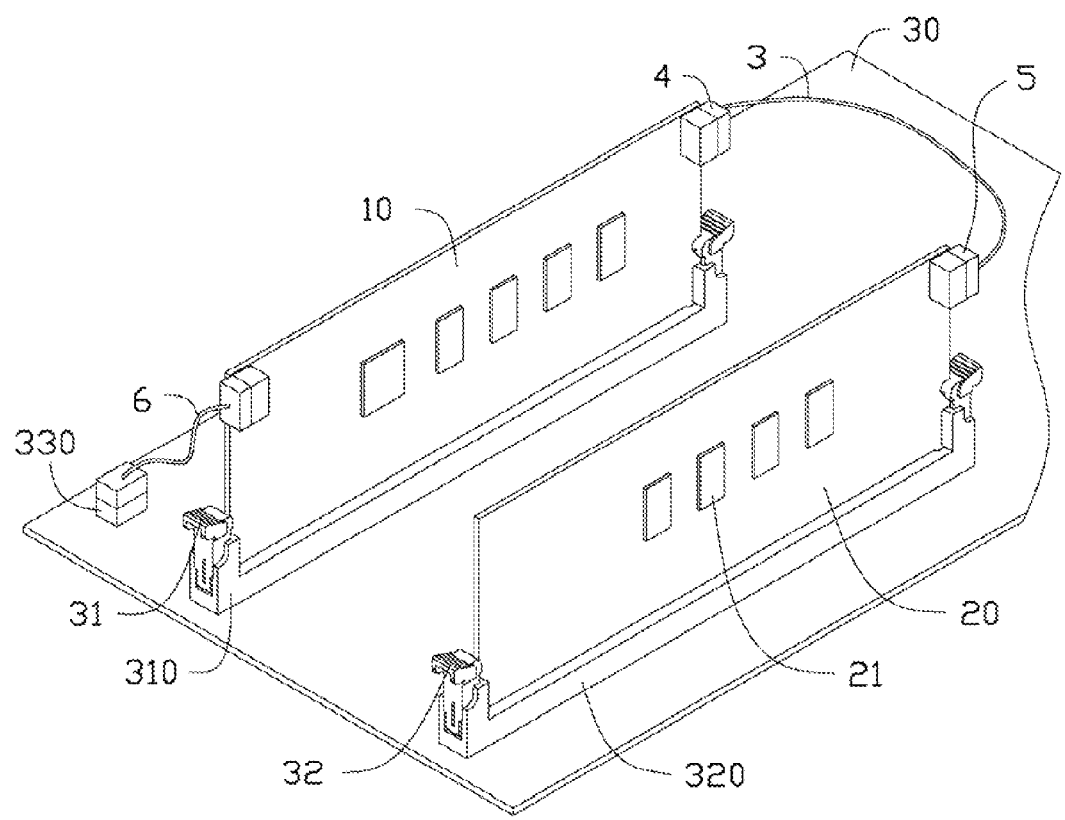
FIG. 2 is a schematic, isometric view of the expansion apparatus of FIG. 1 connected to a motherboard.

Referring to FIGS. 1 and 2, an expansion apparatus 1 in accordance with an exemplary embodiment includes a serial advanced technology attachment dual-in-line memory module (SATA DIMM) 100, an expansion card 200, and a cable member 300.

The SATA DIMM 100 includes a substantially rectangular circuit board 10. A control chip 11, a storage device interface 19, a plurality of storage chips 12, and a connector 13 are arranged on the circuit board 10. The storage device interface 19 is arranged on the circuit board 10, and in this embodiment it is located at a corner of the circuit board 10 and adjacent to a first edge 15 of the circuit board 10. The connector 13 is arranged on the circuit board 10, and in this embodiment it is located at a corner of the circuit board 10 and adjacent to a second edge 17 of the circuit board 10 opposite to the first edge 15. The storage device interface 19 is connected to the control chip 11, to transmit a control signal received from a motherboard 30 to the control chip 11. The control chip 11 is connected to the storage chips 12, to control the storage chips 12 to store data. The control chip 11 is also connected to the connector 13.

An edge connector 18 is set on a bottom edge 16 of the circuit board 10, to be inserted into a memory slot 310 of the motherboard 30. The edge connector 18 includes a plurality of power pins 181 and a plurality of ground pins 182. The power pins 181 are connected to the control chip 11, the storage chips 12, and the connector 13. The ground pins 182 are connected to a ground layer of the circuit board 10. Two grooves 14 are defined in the first and second edges 15 and 17 of the circuit board 10, and located below the storage device interface 19 and the connector 13. In one embodiment, the storage device interface 19 is a SATA connector. In other embodiments, the storage device interface 19 may be an edge connector arranged on the circuit board 10 and according with a SATA standard.

The expansion card 200 includes a substantially rectangular circuit board 20. A plurality storage chips 21 and a connector 22 are arranged on the circuit board 20. The connector 22 is arranged on the circuit board 20, and in this embodiment it is located at a corner of the circuit board 20 and adjacent to a first edge 27 of the circuit board 20. The connector 22 is connected to the storage chips 21. An edge connector 28 is set on a bottom edge 26 of the circuit board 20, to be inserted into a memory slot 320 of the motherboard 30. The edge connector 28 includes a plurality of power pins 281 and a plurality of ground pins 282. The power pins 281 are connected to the storage chips 21 and the connector 22. The ground pins 282 are connected to a ground layer of the circuit board 20. Two grooves 24 are defined in the first edge 27, and a second edge 25 of the circuit board 20 opposite to the first edge 27.

The cable member 300 includes a cable 3, and two connectors 4 and 5 connected to opposite ends of the cable 3. The connector 4 is connected to the connector 13, and the connector 5 is connected to the connector 22. The control chip 11 controls the storage chips 21 to store data through the connector 13, the cable member 300, and the connector 22 according to control signals received from the storage device interface 19.

In assembly, the edge connectors 18 and 28 of the SATA DIMM 100 and the expansion card 200 are inserted into the memory slots 310 and 320. Fixing elements 31 and 32 of the memory slots 310 and 320 are engaged in the corresponding grooves 14 and 24, to fix the SATA DIMM 100 and the expansion card 200 to the motherboard 30. The connector 13 is connected to the connector 22 by the cable member 300. The storage device interface 19 is connected to a storage device interface 330 of the motherboard 30 by a cable 6 with two storage device interfaces.

In use, when the motherboard 30 receives power, the motherboard 30 outputs a voltage to the control chip 11, the storage chips 12, and the connector 13 through the memory slot 310 and the edge connector 18. The motherboard 30 also outputs the voltage to the storage chips 21 and the connector 22 through the memory slot 320 and the edge connector 28. At the same time, the motherboard 30 outputs a control signal, such as a SATA signal, to the control chip 11 through the storage device interface 330, the cable 6, and the storage device interface 19. The control chip 11 controls the storage chips 12 to store data and also controls the storage chips 21 to store data through the connector 13, the cable member 300, and the connector 22.

The SATA DIMM 100, the expansion card 200, and the cable member 300 can add storage capacity to the motherboard 30, at a reduced cost.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An expansion apparatus for a motherboard with two memory slots and a first storage device interface, the expansion apparatus comprising:
   a serial advanced technology attachment dual-in-line memory module (SATA DIMM) comprising:
      a first circuit board;
      a control chip arranged on the first circuit board;
      a second storage device interface arranged on the first circuit board and connected to the control chip, to be connected to the first storage device interface of the motherboard, thereby transmitting a control signal received from the motherboard to the control chip;
      a plurality of first storage chips arranged on the first circuit board and connected to the control chip, wherein the control chip controls the plurality of storage chips to store data according to the control signal;
      a first connector connected to the control chip; and
      a first edge connector set on a bottom edge of the first circuit board, to be inserted into one of the memory slots of the motherboard, wherein the first edge connector comprises a plurality of first power pins and a plurality of first ground pins, the first power pins are connected to the control chip, the first storage chips, and the first connector;
   an expansion card comprising:
      a second circuit board;
      a plurality of second storage chips;
      a second connector connected to the plurality of second storage chips; and
      a second edge connector set on a bottom edge of the second circuit board, to be inserted into the other memory slot of the motherboard, wherein the second edge connector comprises a plurality of second power pins and a plurality of second ground pins, the second power pins are connected to the plurality of second storage chips and the second connector; and
   a cable member comprising:
      a cable;
      a third connector set on a first end of the cable and connected to the first connector; and
      a fourth connector set on a second end of the cable and connected to the second connector.

2. The expansion apparatus of claim 1, wherein the second storage device interface is a SATA connector.

3. The expansion apparatus of claim 1, wherein the second storage device interface is an edge connector arranged on the first circuit board and according with a SATA standard.

4. The expansion apparatus of claim 1, wherein the second storage device interface is arranged on a corner of the first circuit board and adjacent to a first edge of the first circuit board, the first connector is arranged on a corner of the first circuit board and adjacent to a second edge of the first circuit board opposite to the first edge.

5. The expansion apparatus of claim 4, wherein two grooves are defined in the first and second edges of the first circuit board and located below the second storage device interface and the first connector, to accommodate fixing elements of the corresponding memory slot of the motherboard.

6. The expansion apparatus of claim 1, wherein the second connector is arranged on a corner of the second circuit board and adjacent to a first edge of the second circuit board.

7. The expansion apparatus of claim 6, wherein two grooves are defined in the first edge of the second circuit board and a second edge of the second circuit board opposite to the first edge, to accommodate fixing elements of the corresponding memory slot of the motherboard.

* * * * *